United States Patent
Barclay

(10) Patent No.: US 6,315,837 B1
(45) Date of Patent: Nov. 13, 2001

(54) OIL-SAND SEPARATION

(75) Inventor: Thomas Clarkson Barclay, Gloucestershire (GB)

(73) Assignee: Axsia Serck Baker Limited, Gloucester (GB)

( * ) Notice: Subject to any disclaimer, the term of this patent is extended or adjusted under 35 U.S.C. 154(b) by 0 days.

(21) Appl. No.: 09/381,578

(22) PCT Filed: Feb. 2, 1999

(86) PCT No.: PCT/GB99/00334

§ 371 Date: Sep. 22, 1999

§ 102(e) Date: Sep. 22, 1999

(87) PCT Pub. No.: WO99/38617

PCT Pub. Date: Aug. 5, 1999

(30) Foreign Application Priority Data

Feb. 2, 1998 (GB) .................................................. 9802134

(51) Int. Cl.$^7$ ................................ B01D 43/00; B08B 3/02
(52) U.S. Cl. .......................... 134/10; 134/25.1; 134/109; 210/195.1; 210/512.1; 210/787; 210/805; 210/808
(58) Field of Search ............................ 134/25.1, 10, 109; 210/195.1, 512.1, 787, 805, 808

(56) References Cited

U.S. PATENT DOCUMENTS

| 4,159,036 | 6/1979 | Wilson . |
| 4,435,196 | 3/1984 | Pielkenrood-Vinitex . |

FOREIGN PATENT DOCUMENTS

| WO 92 19351 | 11/1992 | (WO) . |
| WO 96 09895 | 4/1996 | (WO) . |

*Primary Examiner*—Zeinab El-Arini
(74) *Attorney, Agent, or Firm*—Nixon & Vanderhye P.C.

(57) ABSTRACT

A slurry of contaminated sand and water is delivered to a solid/liquid hydrocyclone (2) surmounting a pressure vessel (1). That is divided into two sections (3, 4) by a bulkhead (5) leaving a gap between the sections at the top. The partially cleaned sand from the hydrocyclone (2) is dropped into one section (3) while the water is directed to the section (4). The sand is then fluidized with clean, preferably recycled water and directed back through the hydrocyclone (2). This is repeated several times, progressively cleaning the sand. Oil removed by the process floats on the water in the section (4) and is discharged to drain (22). Provision for degassing the pressure vessel (1), discharging the fully cleaned sand, and for flushing and draining the pressure vessel is made.

18 Claims, 3 Drawing Sheets

OIL-SAND SEPARATION

This is a national stage application of PCT/GB99/00334 filed Feb. 2, 1999.

BACKGROUND OF THE INVENTION

1. Field of the Invention

This invention relates to oil-sand separation.

2. Discussion of Prior Art

When crude oil is produced from an oil well, the production stream contains a mixture of oil, gas, water and solids (usually referred to as sand) in varying proportions. The oil, water and gas are separated from one another in one or more pressure vessels commonly known as production separators. If sand is present in significant concentrations, it settles to the bottom of the production separators, where it accumulates, reducing the efficiency of separation of the fluids. The sand is commonly removed by jetting of the production separator, whereby water is introduced into the base of the vessel at high pressure through multiple nozzles. The sand is fluidised to form a slurry and flows out of the production separator through sand outlets provided for the purpose. This sand is often contaminated with oil and needs to be cleaned before it can be disposed of. In addition, the jetted sand slurry, may also contain large quantities of dissolved gas which must be released. It is the aim of this invention to provide an efficient method and compact apparatus for removing this oil and gas.

SUMMARY OF THE INVENTION

According to one aspect of the present invention there is provided a method of cleaning oil-coated sand wherein, in a first stage, a slurry of contaminated sand and water is delivered to a solid/liquid hydrocyclone which substantially separates the sand and water, the sand being directed to one, accumulator part of a pressure vessel in the form of a concentrated slurry and the water being directed to another, degassing part of the pressure vessel, the parts being divided by a barrier that ensures equal pressure in both parts but which prevents migration of the sand from said one to said other part, and wherein, in a second stage, accumulated sand in said one part is flushed therefrom and circulated back through the hydrocyclone and said one part in a cyclic manner, each passage through the hydrocyclone progressively releasing oil from the sand while the flush water circulated with it is directed to said other part of the vessel.

The first stage is carried out under high pressure with the recirculation channel used in the second stage isolated. The second stage is carried out under low pressure with further delivery of contaminated sand cut off.

The water directed to the second part of the pressure vessel is degassed, and having settled to allow any oil to form a surface layer, it may then be pumped back for re-use in the same production separator from which it came or in a production separator from which the next batch of slurry to be cleaned is delivered. The flow of released gas can be regulated to control the pressure in the pressure vessel, thereby controlling the flowrate of contaminated slurry fed to the pressure vessel.

In the second stage it will be preferred to use clean, water to fluidise the sand, which may be treated water originating from the production separators.

Generally, there will be a bank of hydrocyclones in parallel.

According to another aspect of the present invention there is provided apparatus for cleaning oil-coated sand by such a method, the apparatus comprising a pressure vessel divided into two parts by a barrier that allows communication between the parts near the top of the vessel, a solid/liquid hydrocyclone surmounting the vessel with its solid output by gravity into one accumulator part and its separated liquid output to another, degassing part, means for delivering a slurry of contaminated sand to the hydrocyclone, and recycling means for fluidising and circulating the contents of said one part back through the hydrocyclone, these delivery and recycling means being operable mutually exclusively.

Preferably, there will also be means for recycling liquid from said other part back to a production separator for use in forming further slurry of contaminated sand.

BRIEF DESCRIPTION OF THE DRAWINGS

For a better understanding of the present invention one embodiment will now be described, by way of example, with reference to the accompanying drawings, in which.

DETAILED DISCUSSION OF PREFERRED EMBODIMENTS

Figure 1:
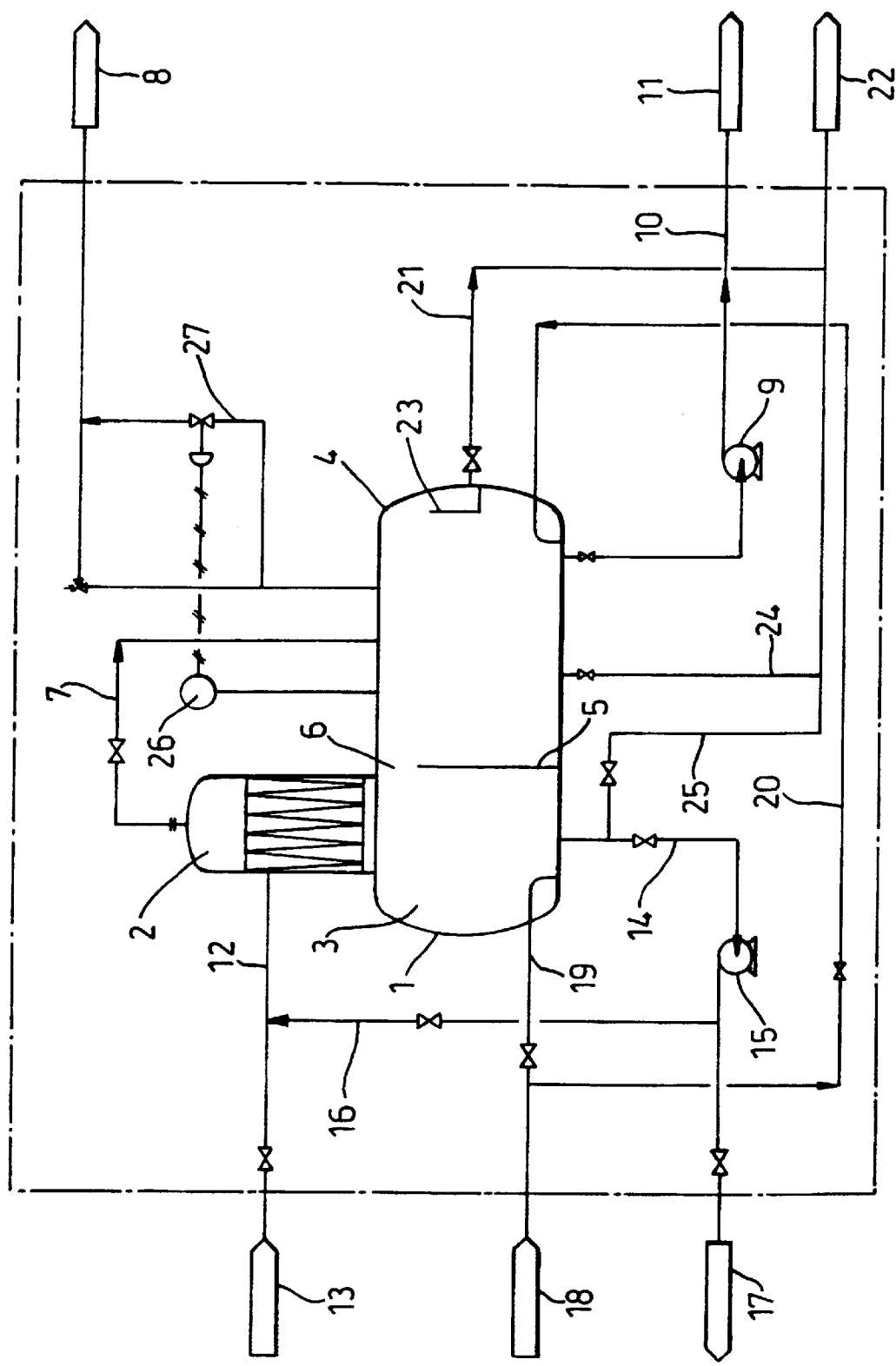
FIG. 1 is a diagram of an oil-sand separator system.

FIG. 1 has been simplified to show the essential features of the invention. However, the same elements are numbered similarly in all Figures.

FIGS. 1–4 disclose the interrelationship of components of the present system. The heart of the system is a pressure vessel 1 surmounted near one end by a battery of solid/liquid hydrocyclones 2 which deliver their concentrated solid slurry outputs directly by gravity into the vessel 1. This is divided into two sections 3 and 4 by a bulkhead 5 which extends up to near the top but which leaves a gap 6, ensuring that both sections are always at equal pressure. The bulkhead 5 is so placed that the section 3 receives substantially all the solids from the hydrocyclones, while the section 4 receives the liquid separated from those solids via pipe 7. This will be oil contaminated water, and the space above it in the vessel 1 is degassed as necessary in a flaring system 8. From the base of the section 4 there is an outlet to a jetting pump 9 which can return water from that section via pipe 10 to an inlet 11 of a production separator (not shown) that produces the contaminated sand in a slurry. This may be the same one through which the water had previously passed or another one from which the next batch is to be delivered. Any oil in the section 4 will tend to form a surface layer and water taken from the bottom will be clean enough to be recirculated indefinitely.

The inlet to the hydrocyclones 2 is a pipe 12 which can selectively be part of a conduit from the outlet 13 of the productive separator referred to above or part of a closed circuit including the hydrocyclones 2, the section 3, an outlet 14 from the bottom of that section, a slurry pump 15, and a connection 16 to the pipe 12. Downstream of the slurry pump 15 there is an isolatable branch 17 for dumping clean sand.

The section 3 also has a flush water supply 18 via pipe 19 for fluidising the sand during the second stage, and this will be clear water which may be treated water originating from the production separators. Flush water can also be directed into the section 4 from this source via pipe 20.

The section 4 has a further outlet 21 to a drain 22 protected within the vessel 1 by a barrier 23 which provides a weir higher than that formed by the bulkhead 5. It also has a second outlet 24 from its base to the drain 22, and there is a branch 25 from the outlet 14 of the section 3 which can connect to the drain 22. These are normally closed.

The operation starts with a slurry of water and oil contaminated sand being jetted from a production separator 13 through pipe 12 to the hydrocyclones 2, using recycled water. The flow of incoming slurry is controlled by means of a pressure control system 26 which regulates the pressure in the vessel 1 by controlling the flow of gas through an outlet line 27 to the vent or gas flaring system 8. This inlet flowrate can be matched to the flowrate of the water pumped out by pump 9 through pipe 10 to maintain a constant level in the section 4. The outlet 14 and connection 16 are closed to isolate the slurry pump 15 and that part of the circuit is depressurised at this stage.

The vortex within the hydrocyclones substantially separates the sand from the water and the sand is delivered directly into the section 3 without having to pass through any pipes or other restrictions. It falls to the bottom and is confined by the bulkhead 5. Meanwhile, the separated water is delivered to the section 4. This water will be suitable to use for jetting without further treatment.

Degassing occurs in the section before the water is returned by pump 9 to the production separator.

When the section 3 is substantially full the jetting of the slurry is stopped and the supply 13 isolated. The circuit with the slurry pump 15 is then opened and the second stage (at low pressure) begun with clean flush water being delivered under pressure to section 3 from supply 18. The slurry thus produced is circulated by the pump 15 through pipe 16 back to the hydrocyclones 2, which subject it to further rapid spin. The resultant shearing action releases oil trapped on the solids. The separated oil-contaminated water goes to section 4, as before, while the cleaner sand drops into the section 3 for further circulation. This continues in a cyclic manner, the hydrocyclones progressively cleaning the sand.

There will always be more water than sand from the hydrocyclones, and so the section 4 will be fuller than the section 3. If the water reaches the top of the bulkhead 5, it will spill over into the section 3, thus ensuring that the flow path in that section is always downwards. There will be no chance of solids finding their way into section 4 against such flow. If it reaches the top of the barrier 23, excess water will discharge to the drain 22.

When the solids are sufficiently clean the connection 16 is closed and the branch 17 opened for the clean slurry to be discharged.

After the cleaned slurry has been discharged there is a short settling stage and then flushing water from supply 18 is re-introduced through pipes 19 and 20 to raise the level in the vessel 1 above the barrier 23. The oil layer which will have accumulated on the surface can then discharge to the drain 22.

The vessel is then fully drained through lines 24 and 25 and the section 4 is recharged with clean flushing water from supply 18 through pipe 20 ready for the next jetting operation.

Figure 2:
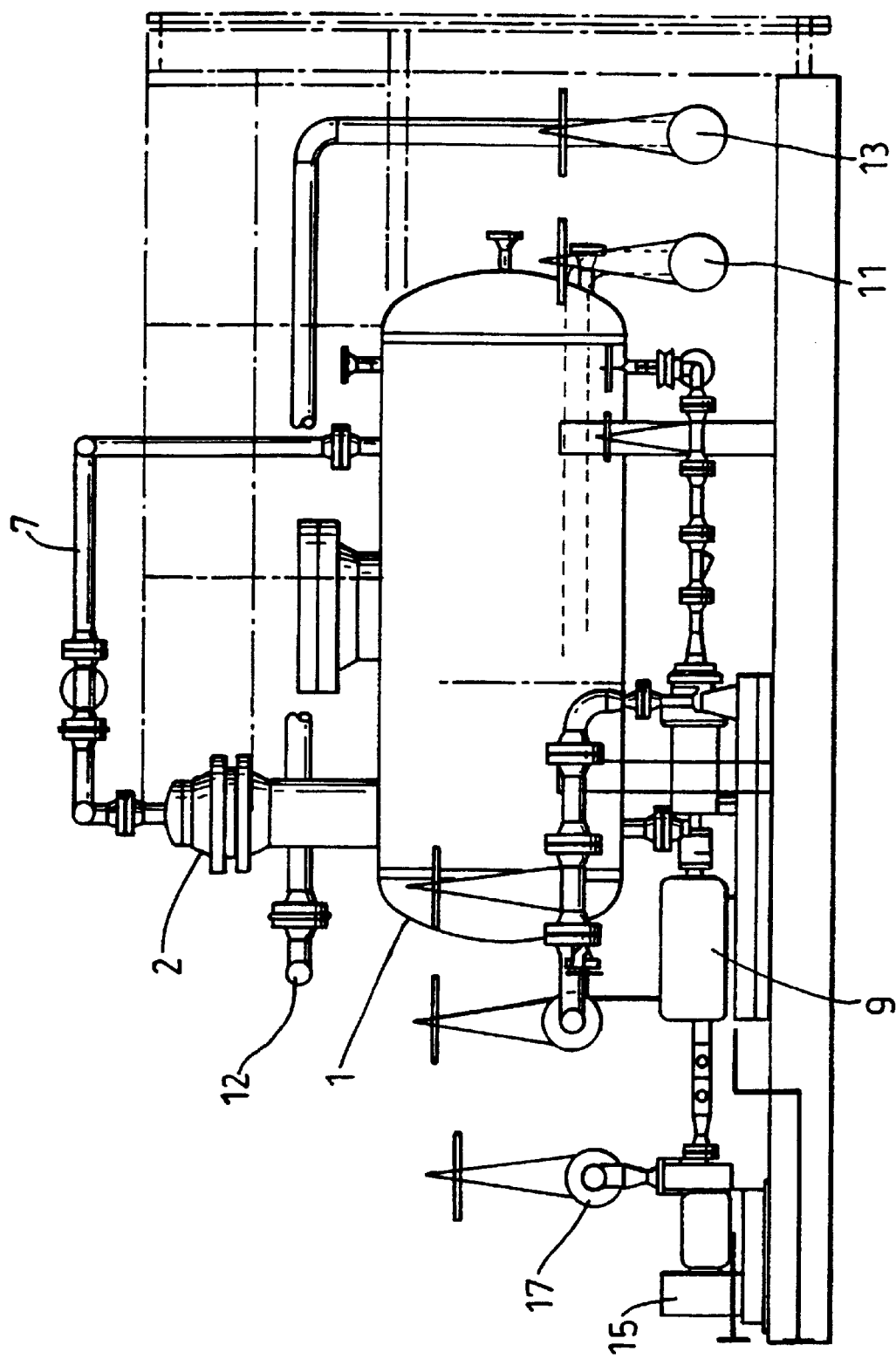
FIG. 2 is a side elevation of an installation of such a system.
Figure 3:
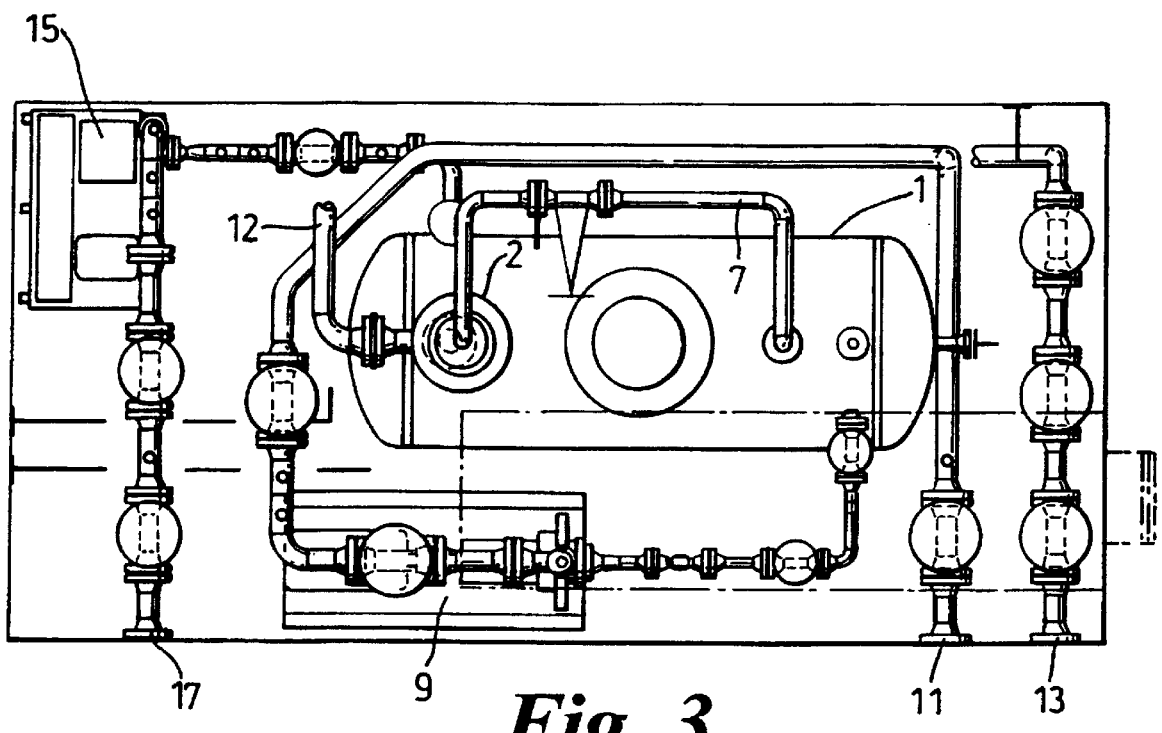
FIG. 3 is a plan view of that installation.
Figure 4:
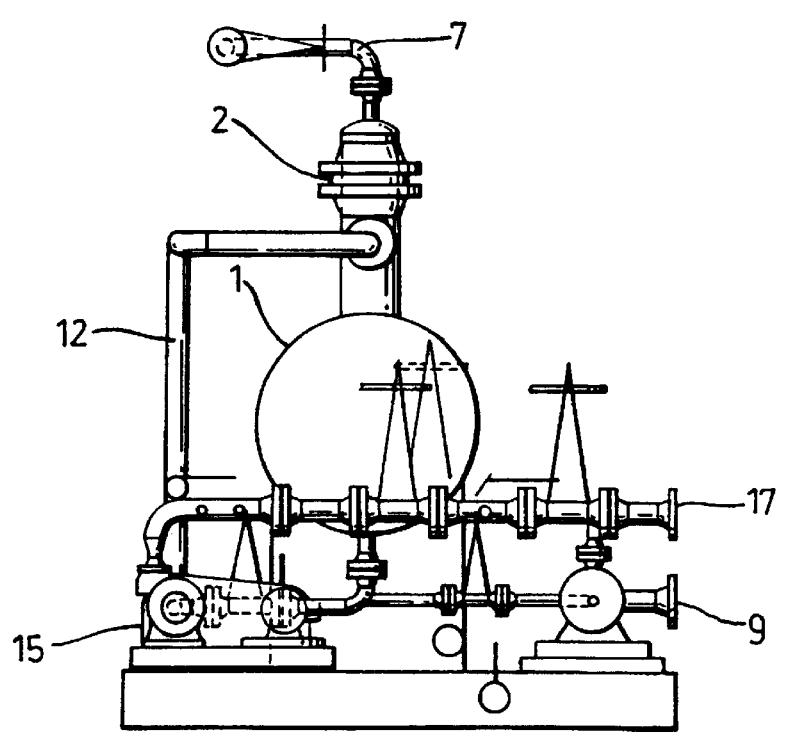
FIG. 4 is an end elevation of that installation.

FIGS. 2, 3 and 4 show how an actual installation might be arranged.

What is claimed is:

1. A method of cleaning oil-coated sand in a production separator wherein, in a first stage, a slurry of contaminated sand and water is delivered to a solid/liquid hydrocyclone which substantially separates the sand and water, the separated sand as a concentrated slurry being directed to an accumulator part of a pressure vessel and the separated water being directed to a degassing part of the pressure vessel, the parts being divided by a barrier that ensures equal pressure in both parts but which prevents migration of the sand from one part to another part, and wherein, in a second stage, accumulated sand in one part is flushed therefrom and recirculated back through the hydrocyclone in a cyclic manner, each passage through the hydrocyclone progressively releasing oil from the sand while the flush water circulated with it is directed to said another part of the vessel.

2. A method as claimed in claim 1, wherein the first stage is carried out under high pressure with the recirculated sand used in the second stage isolated.

3. A method as claimed in claim 1, wherein the second stage is carried out under low pressure with further delivery of contaminated sand cut off.

4. A method as claimed in claim 1, wherein the water directed to the second part of the pressure vessel is degassed and, having settled to allow any oil to form a surface layer, is pumped back for re-use in the production separator.

5. A method as claimed in claim 1, wherein released gas is flow regulated to control pressure in the pressure vessel, thereby controlling flowrate of contaminated slurry fed to the pressure vessel.

6. A method as claimed in claim 1, wherein in the second stage clean water is used to fluidise the sand.

7. A method as claimed in claim 1, wherein the slurry is delivered to a bank of hydrocyclones in parallel.

8. Apparatus for cleaning oil-coated sand by a method as claimed in claim 1, the apparatus comprising:
    a single pressure vessel divided into two parts by a barrier that allows communication between the parts near a top of the vessel;
    a solid/liquid hydrocyclone surmounting the vessel with a solid output moved by gravity into one accumulator part and a separated liquid output to another; degassing part;
    means for delivering a slurry of contaminated sand to the hydrocyclone; and
    recycling means for fluidising and circulating contents of said one part back through the hydrocyclone.

9. Apparatus as claimed in claim 8, wherein means are provided for recycling liquid from said degassing part back to a production separator for use in forming further slurry of contaminated sand.

10. A method of cleaning oil-coated sand wherein, in a first stage, a slurry of contaminated sand and water is delivered to a solid/liquid hydrocyclone which substantially separates the water and oil from the sand, the sand in concentrated slurry form, is directed to an accumulator part of a pressure vessel, and the separated water with oil is directed to a degassing part of the pressure vessel, the parts being divided by a barrier that ensures equal pressure in both parts but which prevents migration of the sand from the accumulator part to the degassing part, and wherein, in a second stage, water is introduced into said accumulator part to create a new slurry with the sand accumulated therein, and this new slurry is flushed from said accumulator part and directed through a recirculation channel back through the hydrocyclone for the first stage to be repeated, and then the second stage, and so on in a cyclic manner, each passage through the hydrocyclone progressively releasing oil from the sand which is directed back to said accumulator part of the vessel while the flush water which made the slurry and which is subsequently tainted by the released oil is directed to said degassing part of the vessel.

11. A method as claimed in claim 10, wherein the initial slurry of contaminated sand and water is from a production separator which can be one of a plurality of production separators, and wherein the oil-bearing water directed to the degassing part of the pressure vessel is degassed and, having settled to allow any oil to form a surface layer, is pumped back for re-use in one of said production separators.

12. Apparatus for cleaning oil-coated sand by a method as claimed in claim 10, the apparatus comprising:

single pressure vessel divided into two side-by-side parts by a barrier having a lip over which there is communication between the parts;

a solid/liquid hydrocyclone surmounting the vessel with a solids output deliverable by gravity into an accumulator part and a separated liquid output to a degassing part;

means for delivering a slurry of contaminated sand to the hydrocyclone; and recycling means for fluidising and circulating the solids deposited in said accumulator part back through the hydrocyclone, the delivery means being operable when the recycling means is out of operation and the recycling means being operable when the delivery means is out of operation.

13. Apparatus as claimed in claim 12, wherein means are provided for recycling liquid from said degassing part back to a production separator for use in forming further slurry of contaminated sand.

14. A method as claimed in claim 10, wherein the first stage is carried out under high pressure with the recirculation channel used in the second stage isolated.

15. A method as claimed in claim 10, wherein the second stage is carried out under low pressure with further delivery of contaminated sand cut off.

16. A method as claimed in claim 10, wherein released gas is flow regulated to control pressure in the pressure vessel, thereby controlling flowrate of contaminated slurry fed to the pressure vessel.

17. A method as claimed in claim 10, wherein in the second stage clean water is used to fluidise the sand.

18. A method as claimed in claim 10, wherein the slurry is delivered to a bank of hydrocyclones in parallel.

* * * * *